United States Patent
Miki et al.

(10) Patent No.: US 7,185,256 B2
(45) Date of Patent: Feb. 27, 2007

(54) COMMUNICATION SYSTEM AND METHOD EMPLOYING AUTOMATIC REPEAT REQUEST

(75) Inventors: Nobuhiko Miki, Yokosuka (JP);
Hiroyuki Atarashi, Yokohama (JP);
Sadayuki Abeta, Kanagawa (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 421 days.

(21) Appl. No.: 09/885,408

(22) Filed: Jun. 21, 2001

(65) Prior Publication Data
US 2002/0046379 A1    Apr. 18, 2002

(30) Foreign Application Priority Data
Jun. 26, 2000 (JP) .............................. 2000-191789

(51) Int. Cl.
*H03M 13/00* (2006.01)
*H04L 1/18* (2006.01)

(52) U.S. Cl. .................... 714/751; 714/18; 714/749; 714/750; 714/748

(58) Field of Classification Search ................ 714/751, 714/748, 774, 18, 1; 370/473, 487, 329, 370/230, 235, 252, 216; 375/358
See application file for complete search history.

(56) References Cited

U.S. PATENT DOCUMENTS 4,888,767 A    12/1989    Furuya et al.
5,781,542 A *  7/1998    Tanaka et al. .............. 370/342
5,844,918 A *  12/1998   Kato ............................ 371/35
5,931,964 A    8/1999    Beming et al.
5,968,197 A    10/1999   Doiron
6,532,211 B1 * 3/2003    Rathonyi et al. ........... 370/230

FOREIGN PATENT DOCUMENTS

| EP | 0 377 136 | 7/1990 |
| EP | 0 411 538 | 2/1991 |
| EP | 0 687 078 | 12/1995 |
| EP | 0 851 612 | 7/1998 |
| EP | 0 891 048 A2 | 1/1999 |
| GB | 2 313 237 | 11/1997 |
| JP | 04111554 | 4/1992 |

(Continued)

OTHER PUBLICATIONS

Tanaka et al. "Information data multiplex transmission system, multiplexer and demultiplexer used terefor, and error correcting encoder and decoder", PCT Pub. No. WO98/58468 (PCT pub. Date: Dec. 13, 1998).*

(Continued)

*Primary Examiner*—Guy J. Lamarre
(74) *Attorney, Agent, or Firm*—Oblon, Spivak, McClelland, Maier & Neustadt, P.C.

(57) ABSTRACT

A communication system and method includes the steps of: a) transmitting an ACK signal indicating a received packet includes no error or a NACK signal indicating the received packet includes error from a reception end to a transmission end, and performing automatic repeat request; b) obtaining reliability of the received packet when demodulating it at the reception end; and c) reporting from the reception end to the transmission end the reliability of the received packet utilizing the ACK/NACK signal by using not less than three levels.

9 Claims, 11 Drawing Sheets

FOREIGN PATENT DOCUMENTS

| | | |
|---|---|---|
| JP | 05-110539 | 4/1993 |
| KR | 10-0355523 | 1/2000 |
| KR | 10-0304606 | 3/2000 |
| WO | WO 88/04496 | 6/1988 |
| WO | WO 00/05911 | 2/2000 |
| WO | WO 00/10348 | 2/2000 |
| WO | WO 00/21236 | 4/2000 |

OTHER PUBLICATIONS

Cam et al. (Efficient ARQ schemes for point-to-multipoint communication; IEEE International Conference on Communications; Jun. 23-26, 1991; On pp. 1627-1632 vol. 3).*

Lin et al. (RMTP: a reliable multicast transport protocol; INFOCOM '96. Fifteenth Annual Joint Conference of the IEEE Computer Societies. Networking the Next Generation. Proceedings IEEE; Mar. 24-28, 1996,On pp. 1414-1424 vol. 3).*

Koichi Okawa, et al., Effect of Hybrid ARQ on Broadband Wireless Packet Transmission:, Wireless Research Laboratories, NTT Mobile Communications Network, Inc., p. 502.

Shu Lin, et al., "Automatic-Repeat-Request Error-Control Schemes", IEEE Communications Magazine, vol. 22, No. 12, Dec. 1984, pp. 5-17.

Slim Souissi, et al., "A Diversity Combining DS/CDMA System with Convolutional Encoding and Viterbi Decoding", IEEE Transactions on Vehicular Technology, vol. 44, No. 2, May 1995, pp. 304-312.

Joachim Hagenauer, "Rage-Compatible Punctured Convolutional Codes (RCPC Codes) and Their Applications", IEEE Transactions on Communications, vol. 36, No. 4, Apr. 1988, pp. 389-400.

Toyoki UE, et al., "Performance of Symbol Rate and Modulation Level Controlled Adaptive Modulation System", The Institute of Electronics, Information and Communication Engineers, Technical Report of IEICE. SST95-21, CS95-28, RCS95-30, May 1995, pp. 25-30.

Masashi Naijoh, et al. "Type-II Hybrid ARQ Scheme Using Punctured Convolutional Code with Adaptive Modulation Systems", The Institute of Electronics, Information and Communication Engineers, Technical Report of IEICE. CS96-27, RCS96-20, May 1996, pp. 19-24.

* cited by examiner

COMMUNICATION SYSTEM AND METHOD EMPLOYING AUTOMATIC REPEAT REQUEST

BACKGROUND OF THE INVENTION

1. Field of the Invention

The present invention relates to packet transmission employing automatic repeat request (ARQ) under environment of mobile communication.

2. Description of the Related Art

Recently, as the Internet has widely spread, a demand on data communication under mobile communication environment has increased remarkably, and, achievement of mobile communication having a higher data rate and a larger capacity than those of a next generation mobile communication system (IMT-2000) is expected. In data communication field, as data transmission at various data rates and quality of service is required, a packet transmission system in which data is divided into packets of fixed information amounts which are then transmitted is effective.

Further, in a data communication field, error free transmission must be guaranteed, differently from voice communication or the like. Accordingly, automatic repeat request (ARQ; see "Automatic repeat request error control schemes," S. Lin, D. J. Costello, and M. J. Miller, IEEE Trans. Commun. Mag., vol. 22, pp. 5–17, December 1984) is essential. In ARQ, a packet encoded with an error detection code added to a information signal sequence is transmitted from a transmission end, and, at a reception end, a re-transmission request for the packet is made toward the transmission end when error has been found in the received packet by using the error detection code. At the transmission end, the packet for which the re-transmission request was made is transmitted again, and this operation is repeated until no error is found in the reception end. Thereby, error free transmission can be achieved.

However, according to ARQ, such a re-transmission request occurs frequently when a channel condition is not satisfactory, and, thereby, a transmission performance is remarkably degraded. In order to solve this problem, Hybrid ARQ in which error probability is reduced as a result of employing a forward error correction code in addition to the error detection code is proposed. Hybrid ARQ includes Type-I in which the re-transmission packet is identical to the initial transmission packet, and Type-II/III in which the re-transmission packet is not identical to the initial transmission packet. In Type-I, study has been made such that when a received packet includes error at a reception end, the packet is stored, and, after a re-transmission packet is received, both the packets are combined together symbol-by-symbol. Thereby, packet combining such that a signal-to-noise ratio (SNR) can be improved may be achieved (see "A Diversity Combining DS/CDMA system with convolutional encoding and Viterbi decoding," S. Souissi and S. Wicker, IEEE Trans. Veh. Techol., vol. 44, No. 2, pp. 304–312, May 1995).

On the other hand, in Type-II/III, original code is restored by combining the already transmitted packet and re-transmission packet which are punctured by the different puncturing pattern. Thereby, it is possible to improve the coding rate (see "Rate-compatible punctured convolutional codes and their applications," J. Hagenauer, IEEE Trans. Commun. vol. 36, pp. 389–400, April 1988).

Further, according to IMT-2000, information transmission of maximum 2 Mbps is rendered. However, a higher transmission rate is needed in consideration of future demand. Therefore, employing of a variable rate system such that the transmission rate can be improved without widening the frequency band by changing the modulation level and coding rate appropriately when a situation of a transmission channel is satisfactory is being studied (see "Performance of Symbol Rate and Modulation Level Controlled Adaptive Modulation System,", Toyoki Ue, Seiichi Sampei, and Norihiko Morinaga, Technical Report of IEICE, SST95-21, CS95-28, RCS95-30, May 1995). Further, with regard to ARQ employing a variable rate system, a study has been made (see "Type-II Hybrid ARQ Scheme using Punctured Convolutional Code with Adaptive Modulation Systems,", Masashi Naijoh, Seiichi Sampei, Norihiko Morinaga, and Yukiyoshi Kamino, Technical Report of IEICE, CS96-27, RCS96-20, May 1996). According to this study, at a reception end, a situation of a transmission channel is estimated, and, based on a result of the estimation, transmission parameters such as the modulation levels, coding rate and symbol rate are determined.

On the other hand, in consideration of commonality with IMT-2000, CDMA is a promising candidate as an access method, and, a composite technique of transmission power control and site diversity which are inherent to CDMA, with ARQ is demanded. According to CDMA, a same frequency is used in common with other users. Accordingly, when a power larger than a required one is transmitted, the number of users who can use the same frequency band is reduced. Therefore, in order to prevent the transmission power from exceeding a required one, transmission power control is performed. For example, a transmission power control signal (for example, a TPC command for increasing or decreasing the power at a transmission end) is transmitted from a reception end to the transmission end such that the power to be transmitted from the transmission end is controlled so that power received by the reception end may be kept constant.

Further, in CDMA system, as one frequency is repeatedly used, site diversity is performed such that signals from a plurality of base stations are received/transmitted in a time overlapped manner.

SUMMARY OF THE INVENTION

In ARQ, an ACK/NACK signal is sent to a transmission end as a feedback signal, and is conventionally used as a control signal for re-transmission request. However, when the ACK signal is repeatedly sent to the transmission end, this means that the communication situation is satisfactory. On the other hand, when the NACK signal is repeatedly sent to the transmission end, this means that the communication situation is not satisfactory.

Accordingly, an object of the present invention is to improve the transmission performance by effectively utilizing the ACK/NACK signal in ARQ.

A communication method according to the present invention comprises the steps of:

a) transmitting an ACK signal indicating that a received packet includes no error or a NACK signal indicating that the received packet includes error, from a reception end to a transmission end, and performing automatic repeat request;

b) obtaining reliability of the received packet when demodulating it at the reception end; and c) reporting from the reception end to the transmission end the reliability of the received packet utilizing the ACK/NACK signal by using not less than three levels.

Thereby, the transmission end can perform transmission control suitable to a transmission situation according to the reliability of the received packet at the reception end.

The method may further comprise the step of d) determining based on the reliability of the received packet whether or not the received packet is to be stored so as to be combined with a re-transmission packet, when the received packet includes error.

Thereby, it can be prevented that performance degradation occurs as a result of using a received packet having low reliability for combination with the re-transmission packet.

The method may further comprise the step of d) performing control of a transmission parameter at the transmission end based on the ACK/NACK signal transmitted from the reception end.

Thereby, the transmission end can perform transmission parameter setting suitable to transmission situation according to the reliability of the received packet obtained at the reception end.

A communication method for a mobile communication system according to another aspect of the present invention performs power control at a transmission end so that reception quality at a reception end is made to be constant. The method may comprise the steps of:

a) transmitting an ACK signal indicating that a received packet includes no error or a NACK signal indicating that the received packet includes error, from a reception end to a transmission end, and performing automatic repeat request; and b) performing control of a transmission parameter at the transmission end utilizing the ACK/NACK signal and a transmission power control signal.

Thereby, it is possible to perform highly precise transmission control by utilizing the ACK/NACK signal and transmission power control signal.

The method may further comprise the step of c) re-transmitting a re-transmission packet re-built so as to be able to be properly/effectively combined with an already transmitted packet at the reception end, when an information transmission rate from the transmission end is changed through the transmission parameter control at the transmission end.

Thereby, the reception end can properly/effectively combine the already transmitted packet with the currently received packet so as to obtain a highly reliable packet from the received packet.

A communication method for a mobile communication system according to another aspect of the present invention, comprises the steps of:

a) transmitting an ACK signal indicating that a received packet includes no error or a NACK signal indicating that the received packet includes error, from a reception end to a transmission end, and performing automatic repeat request; and b) when uplink site diversity reception is performed such that a plurality of base stations simultaneously receive a signal transmitted from a mobile station, generating the ACK/NACK signals at the plurality of base stations, and transmitting them to the mobile station and a host station of the plurality of base stations, then the mobile station using the ACK/NACK signals from the plurality of base stations and performing re-transmission control.

Thereby, even when the uplink site diversity reception is performed, the host station and mobile station can perform determination as to existence/absence of packet error independently. Especially, in the mobile station, as it can perform re-transmission control independently without waiting for a final determination from the host station, it is possible to effectively reduce a processing delay, and, also, to reduce the necessary transmission buffer amount.

The method may further comprise the step of c) generating the ACK signal and transmitting it to each base station from the host station of the plurality of base stations, when the host station receives the ACK/NACK signals from the plurality of base stations which include not less than n ($\geq 1$) ACK signals.

The method may further comprise the step of c) determining at the mobile station that proper reception was performed at the reception end, when the mobile station receives the ACK/NACK signals from the plurality of base stations which include not less than n ($\geq 1$) ACK signals.

A communication method for a mobile communication system according to another aspect of the present invention, comprises the steps of:

a) transmitting an ACK signal indicating that a received packet includes no error or a NACK signal indicating that the received packet includes error, from a reception end to a transmission end, and performing automatic repeat request; and b) when uplink site diversity reception is performed such that a plurality of base stations simultaneously receive a signal transmitted from a mobile station, generating the ACK/NACK signal at a host station of the plurality of base stations, and, transmitting from the plurality of base stations the same ACK/NACK signals generated by the host station to the mobile station.

In this configuration, packets from the plurality of base stations are combined together, and thereby, it is possible to obtain highly reliable packet information. The mobile station uses the same ACK/NACK signals transmitted from the plurality of base stations and can perform highly reliable re-transmission control.

A communication method for a mobile communication system according to another aspect of the present invention, comprises the steps of:

a) transmitting an ACK signal indicating that a received packet includes no error or a NACK signal indicating that the received packet includes error, from a reception end to a transmission end, and performing automatic repeat request; and b) when downlink site diversity reception is performed such that signals transmitted from a plurality of base stations are simultaneously received by a mobile station, demodulating a received packet at the mobile station, generating the ACK/NACK signal, and transmitting it;

c) when the host station of the plurality of base stations receives the ACK/NACK signals via the plurality of base stations which include not less than n ($\geq 1$) ACK signals, determining at the host station that the plurality of base stations performed proper reception, thereby re-transmission control being performed at the plurality of base stations.

In this configuration, as the plurality of base stations performing the downlink site diversity perform transmission according to the same ACK/NACK signals. Thereby, the mobile station can obtain site diversity effect.

Other objects and further features of the present invention will become more apparent from the following detailed description when read in conjunction with the accompanying drawings.

DETAILED DESCRIPTION OF THE PREFERRED EMBODIMENTS

Figure 1:
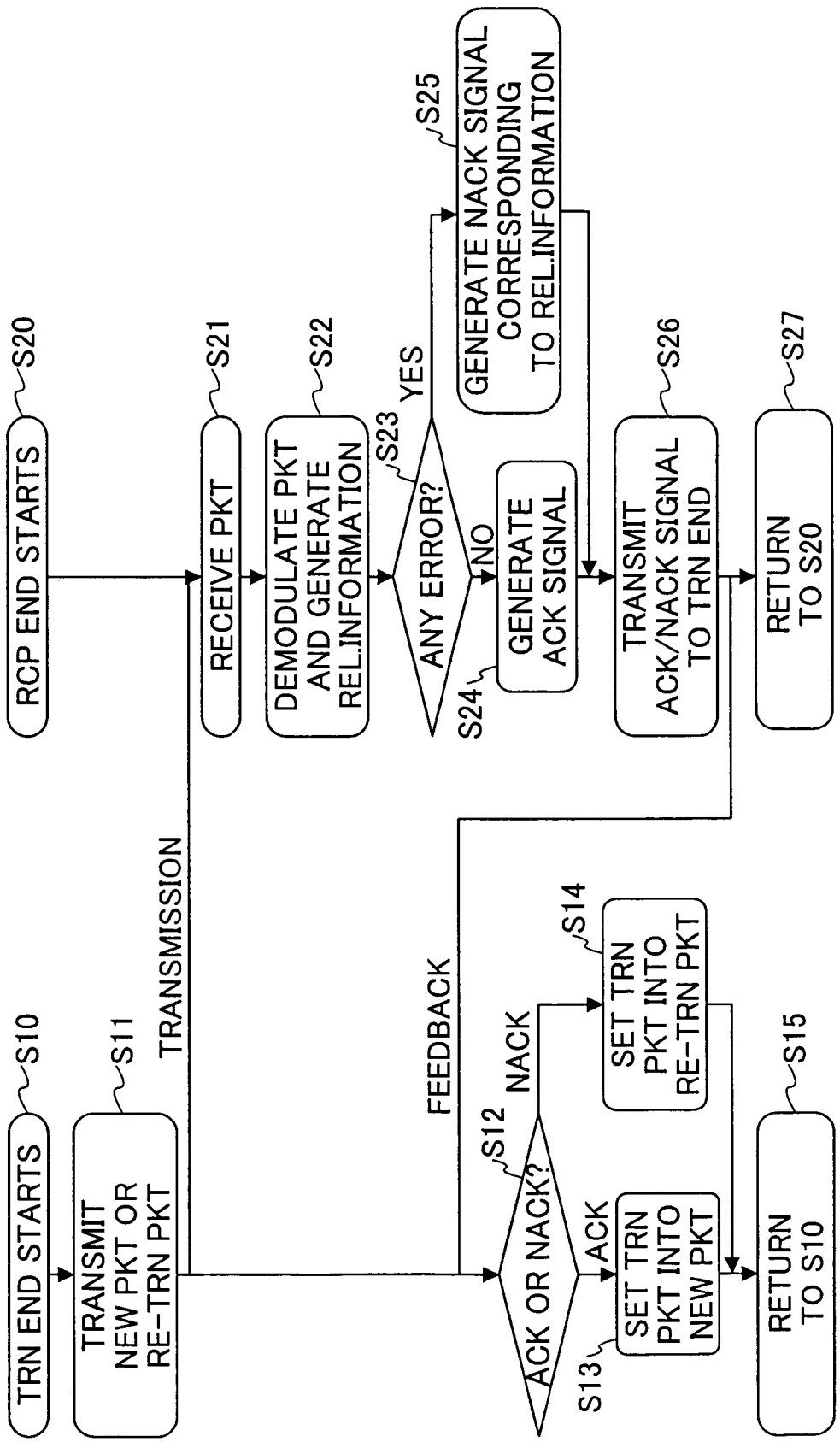
FIG. 1 illustrates a case where an ACK/NACK signal expressed by not less than three levels is generated, according to the present invention.

FIG. 1 shows a control flow at a transmission end and a reception end in ARQ having a feature of generating an ACK/NACK signal which can be expressed by not less than three levels.

The transmission end starts (in step S10) and transmits a new packet or a re-transmission packet to the reception end (in a step S11). The reception end starts (in step S20) receives this packet (in a step S21), demodulates it, and, also, calculates reliability of the demodulated packet so as to obtain reliability information (in a step S22).

In order to obtain the reliability information, the path metric value calculated in a process of decoding may be used in a case where the convolution code and Viterbi decoding are used as forward error correction coding and decoding, for example. In this case, as the final path metric value is smaller, the decoded signal is more reliable. Accordingly, this value can be used as the reliability information for the received packet. Alternatively, it is also possible to use the power level of the received signal measured at the reception end, or the signal-to-interference ratio (SIR) measured at the reception end may also be used as the reliability information. In this case, when the received power is large or SIR is large, it can be determined that the reliability of the received packet is high. When the received power is small or SIR is small, it can be determined that the reliability of the received packet is low.

Then, it is determined in a step S23, by using error detection code, for example, whether or not the demodulated packet includes error. Then, by using a result of this error detection and the above-mentioned packet reliability, the ACK/NACK signal expressed by more than two levels is generated (in steps S24 and S25), and is sent to the transmission end as a feedback signal (in step S26). The process then returns to step S20 (in step S27).

According to the related art, the ACK/NACK signal is expressed by two levels. In this case, the signal having the value of "0"/"1" is used for expressing absence/existence of error in the packet, for example, to be sent to the transmission end as a feedback signal. In contrast thereto, according to the present invention in which the ACK/NACK signal expressed by more than two levels is generated as mentioned above, "000" of the ACK/NACK signal is assigned for a case where no error is detected and thus the packet has the highest reliability, and, then, signals of "001" through "111" (NACK(0) through NACK(6)) are assigned corresponding to the reliability levels in the order therefrom, as shown below:

TABLE 1

| RELIABILITY | ACK/NACK | EXPRESSION |
|---|---|---|
| HIGH (NO ERROR) | ACK (0) | 000 |
|  | NACK (0) | 001 |
|  | NACK (1) | 010 |
| LOW | NACK (2) | 011 |
|  | NACK (3) | 100 |
|  | NACK (4) | 101 |
|  | NACK (5) | 110 |
|  | NACK (6) | 111 |

Thus, it is possible to generate the ACK/NACK signal expressed by more than two levels. The above Table-1 shows an example of the ACK/NACK signal having 8 levels. However, the number of the levels may be set freely.

Then, the transmission end receives the ACK/NACK signal, and determines whether the ACK/NACK signal expresses ACK or NACK (in step S12). When the ACK/NACK signal expresses ACK, the transmission end deletes the already transmitted packet from a transmission buffer, and sets the transmission packet to be a new packet (in a step S13). Further, when the received ACK/NACK signal expresses NACK, the transmission end sets the transmission packet to be a re-transmission packet (in step S14). Accordingly, when receiving the ACK signal, the transmission end transmits a new packet. However, when receiving the NACK signal, the transmission end transmits the re-transmission packet (the packet same as or corresponding to that which was already transmitted). The method then returns to step S10 (in step S15).

Figure 2:
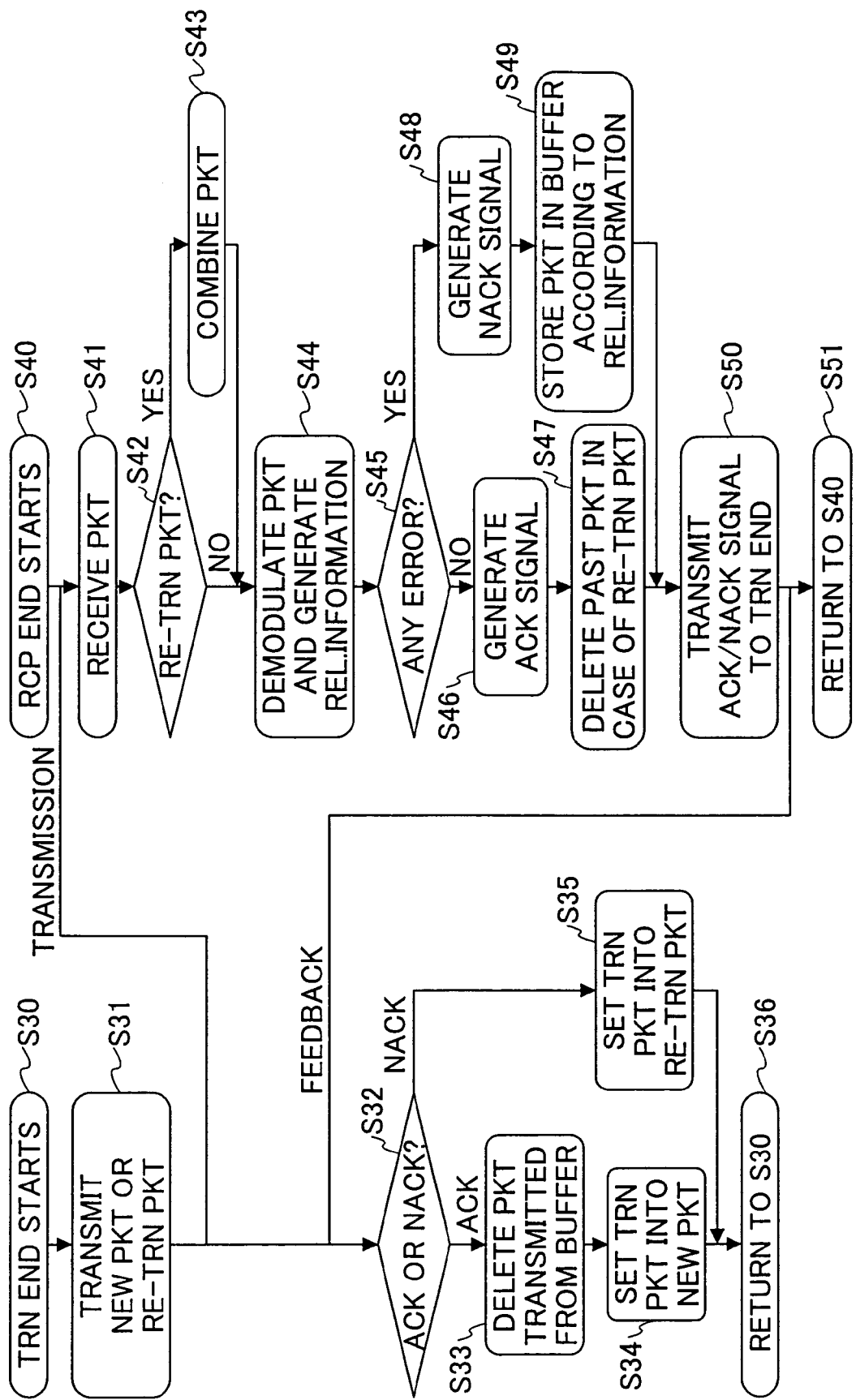
FIG. 2 illustrates a case where it is determined according to the reliability of a received packet whether the received packet is to be stored or to be discarded, according to the present invention.

FIG. 2 shows one embodiment of a control flow according to the present invention in which whether a received packet is stored or is discarded is determined according to the reliability of the received packet.

Similar to FIG. 1, the transmission end transmits a new packet or a re-transmission packet to the reception end. In this case, the transmission end transmits a signal including an identification signal such that the reception end can determine therefrom whether the packet is a new one or a re-transmission one (in a step S31). The reception end receives the packet (in a step S41), and determines, from the above-mentioned identification signal, whether the packet is a new one or a re-transmission one (in a step S42). When determining that the received packet is a new one which is received for the first time, the current operation is proceeded to the next step. However, when determining that the received packet is a re-transmission one, the reception end combines this packet with the corresponding packet (already transmitted packet) but received in the past time and stored in a reception buffer (in a step S43).

By performing the combination, it is possible to obtain the received packet but having a higher reliability. As a method of combining the currently received packet with the same or corresponding packet but received in the past time (already transmitted packet), the above-mentioned packet combination, code combination or the like may be used, for example. Then, in the case of the new packet, the received packet is demodulated. In the case of the re-transmission packet, the combined packet is demodulated. Further, similar to FIG. 1, the reliability of the packet is calculated, and the reliability information is obtained (in a step S44).

Then, whether or not the demodulated packet includes error is determined by using error detection code, for example (in a step S45). When no error is found out, an ACK signal is generated (in a step S46), and, also, in the case of the re-transmission packet, the packet stored in the buffer is deleted (in a step S47).

When error is detected, a NACK signal is generated (in a step S48), and, according to the reliability information of the received packet, it is determined whether or not the packet for which the error was detected is to be stored in the buffer of the reception end. When the reliability of the received packet is very low, merely a little effect is expected even if this packet is stored and is combined with a re-transmission packet, and, also there may be a case where a possibility that error occurs is rather increased by the combination. Accordingly, the received packet is stored only when the reliability thereof is high, but it is discarded when the reliability thereof is low (in a step S49). The other steps S30, S40, S50—S50 and S32–S36 are the same as the corresponding steps of FIG. 1, and description thereof is omitted.

Thus, only a packet having a reliability higher than a predetermined threshold is stored in the buffer and used for being combined with a re-transmission packet. Thereby, it is possible to effectively reduce the storage capacity of the buffer.

Figure 3:
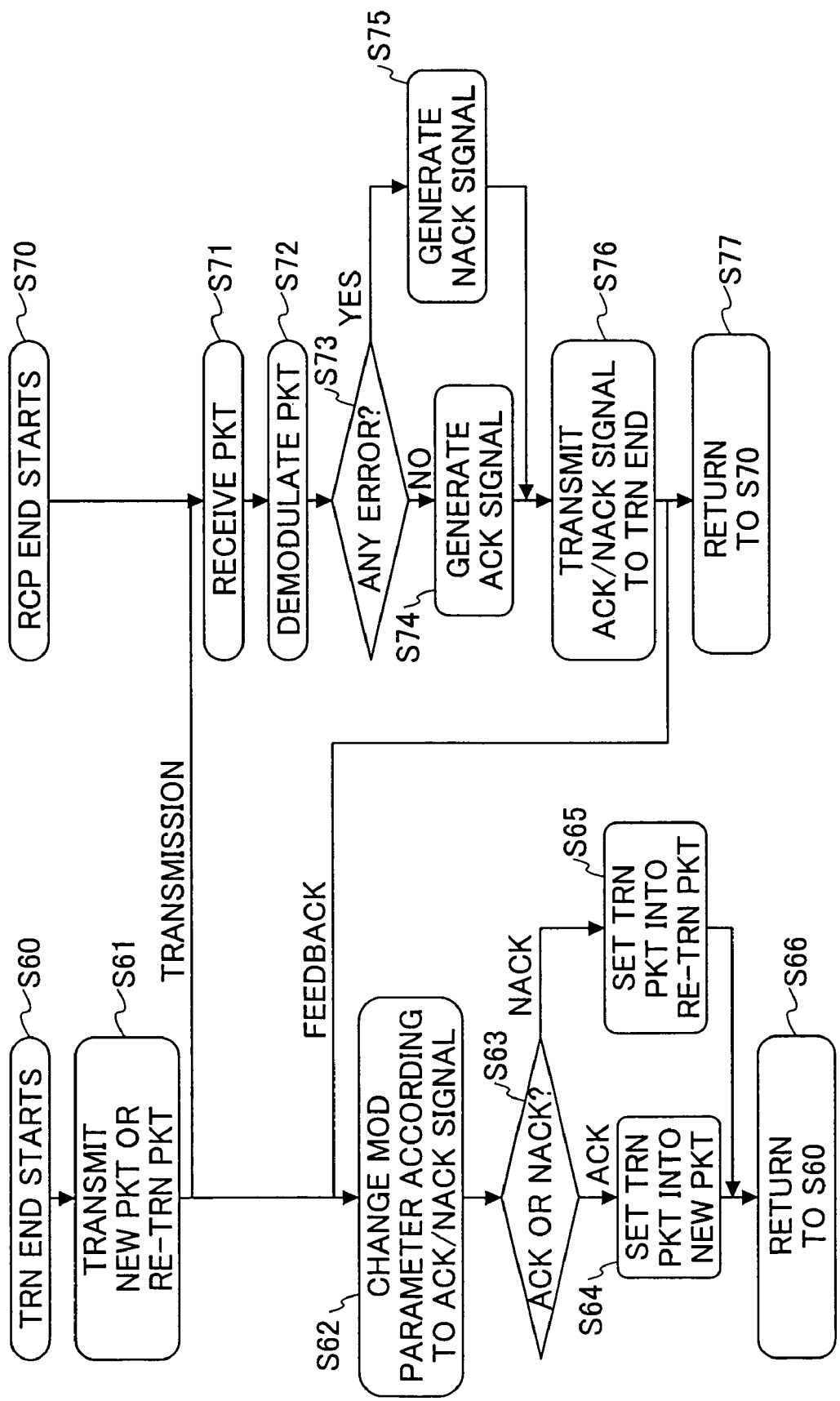
FIG. 3 illustrates a case where a transmission end controls transmission parameters according to an ACK/NACK signal sent from a reception end as a feedback signal, according to the present invention.

FIG. 3 shows one embodiment of a packet transmission control flow according to the present invention in which the transmission end controls transmission parameters in accordance with the ACK/NACK signal sent from the reception end as a feedback signal.

In FIG. 3, transmission of a new packet or a re-transmission packet from the transmission end (in a step S61), reception of the packet by the reception end (in a step S71), demodulation of the packet (in a step S72), determination as to existence/absence of error (in a step S73), generation of the ACK signal (in a step S74) or generation of the NACK signal (in a step S75), and transmission of the ACK/NACK signal to the transmission end (in a step S76) are the same as those in general ARQ method, and description thereof is omitted.

In the control flow shown in FIG. 3, a modulation parameter(s) (transmission parameter(s)) at the transmission end are changed based on the received ACK/NACK signal in a step S62. Steps S60, S70, S77 and S63–S66 are substantially the same as the corresponding steps of FIG. 1. and description thereof is omitted.

Specifically, based on the received ACK/NACK signal, the channel condition is estimated, and, according to the estimated condition, the transmission parameter(s) is(are) controlled at the transmission end.

As the transmission parameter(s) to be thus controlled, the number of modulation levels, coding rate, symbol rate, transmission power value and so forth can be used. Then, as shown in Table-2 through Table-6 below, the parameter(s) is(are) set in accordance with the estimated condition.

Table-2 shows setting of the number of modulation levels in accordance with the estimated condition, Table-3 shows setting of the coding rate in accordance with the determined level, Table-4 shows setting of the symbol rate in accordance with the estimated condition, and Table-5 shows setting of the transmission power value in accordance with the estimated condition.

TABLE 2

| LEVEL | MODULATION METHOD (NUMBER OF MODULATION LEVELS) |
|---|---|
| 1 | BPSK (1) |
| 2 | QPSK (2) |
| 3 | 16 QAM (4) |
| 4 | 64 QAM (6) |

TABLE 3

| LEVEL | CODING RATE |
|---|---|
| 1 | $r_0$ |
| 2 | $r_1$ |
| 3 | $r_2$ |
| 4 | $r_3$ |

WHERE $r_0 \leq r_1 \leq r_2 \leq r_3$.

TABLE 4

| LEVEL | SYMBOL RATE |
|---|---|
| 1 | $M_0$ sps |
| 2 | $M_1$ sps |
| 3 | $M_2$ sps |
| 4 | $M_3$ sps |

WHERE $M_0 \leq M_1 \leq M_2 \leq M_3$.

TABLE 5

| LEVEL | TRANSMISSION POWER VALUE |
|---|---|
| 1 | $x_0$ |
| 2 | $x_1$ |
| 3 | $x_2$ |
| 4 | $x_3$ |

WHERE $x_0 \geq x_1 \geq x_2 \geq x_3$.

In these tables, the number of level corresponds to the communication situation between the transmission end and reception end determined, and, expression is made such a manner that the larger number of level (LEVEL) indicates the more satisfactory communication situation, and the suitable parameter will be set therefor.

As a method of setting the modulation parameter based on the ACK/NACK signal at the transmission end, a method may be employed such that the modulation parameter to be set is determined based on a history of the ACK/NACK signals, for example. In fact, successively sent ACK signals indicate that the communication situation is satisfactory. In contrast thereto, successively sent NACK signals indicate that the communication situation has become degraded. Accordingly, when a predetermined number of ACK signals are received successively, the parameter(s) shown in Table-2 through Table-5 to be set are to be one(s) corresponding to an increased level. In contrast thereto, when a predetermined number of NACK signals are received successively, the parameter(s) shown in Table-2 through Table-5 to be set are to be one(s) corresponding to a decreased level.

Further, as the above-described control of the modulation parameter(s) is performed based on the ACK/NACK signal generated at the reception side, it is not necessary to inform the modulation parameter(s) to be set for the transmission packet from the transmission end to the reception end when a consensus as to how to determine the parameter(s) to be set based on the ACK/NACK signal is previously made between the transmission end and reception end.

Figure 4:
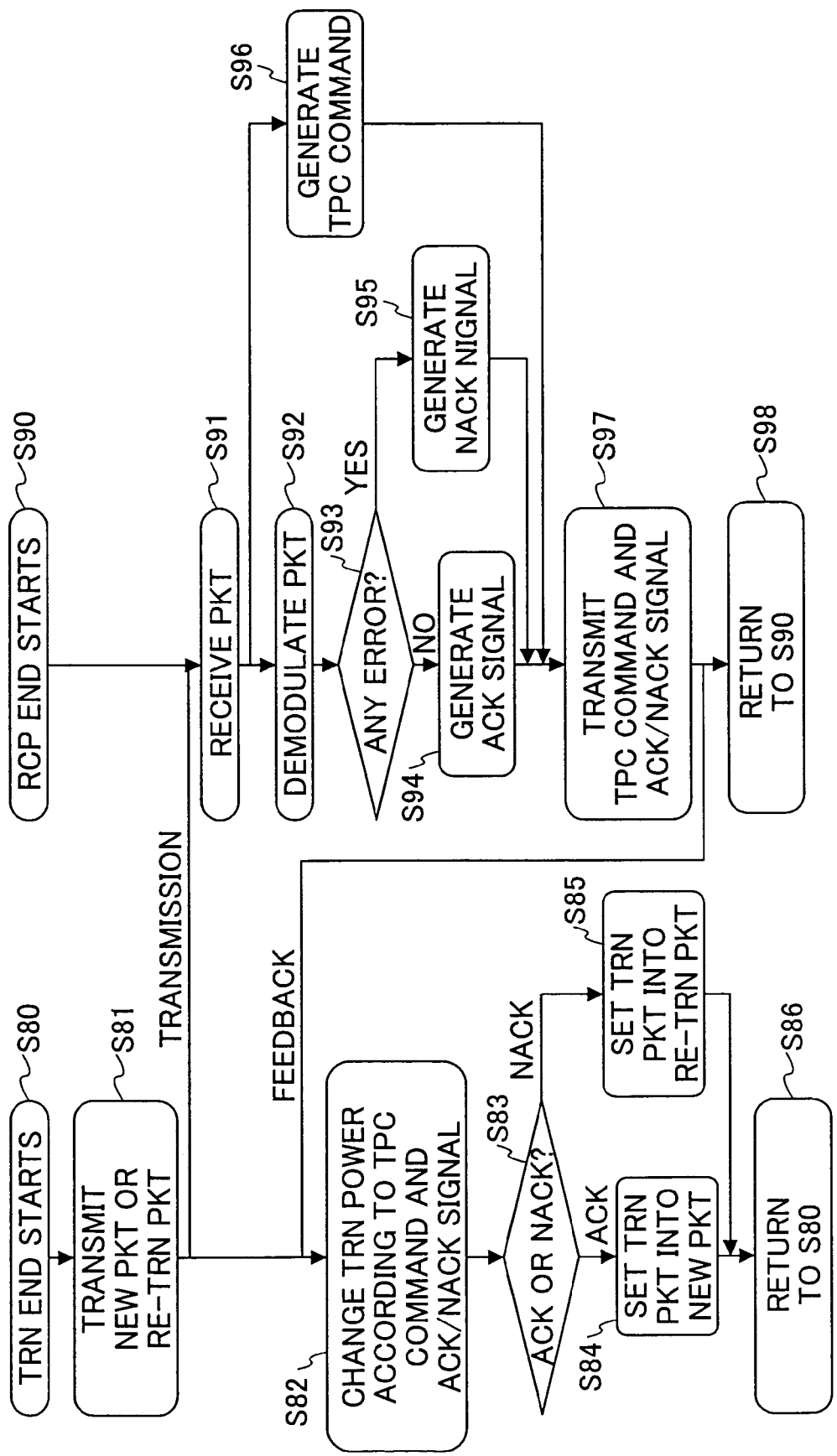
FIG. 4 illustrates a case where both an ACK/NACK signal and a transmission power control command are utilized in combination together, according to the present invention.

FIG. 4 shows one embodiment of a transmission power control flow in which, in CDMA packet transmission, in a case where the transmission power of the transmission end is controlled periodically for the purpose of achieving a constant reception quality at the reception end, both a signal (transmission power control (TPC) command) for correcting the transmission power at the transmission end and the ACK/NACK signal are utilized in combination together.

At the transmission end, a new packet or a re-transmission packet is selected from the transmission buffer and transmitted (in a step S81). The reception end receives this packet (in a step S91).

For example, based on the reception signal power level, the reception end generates a command (TPC command) to control the transmission power of the transmission end (in a step S96) such that the quality of the received signal (reception quality) may be made constant.

As for the above-mentioned reception quality, various values can be used such as an error rate, a signal-to-interference ratio (SIR), a power level of the received signal and so forth, measured at the reception end. A target value(s) is previously set for the measured value(s), and, when the measured value(s) does not satisfy the target quality, it is necessary to increase the transmission power at the transmission end. For this purpose, a transmission power control (TPC) command Up is set. In contrast thereto, in order to decrease the transmission power at the transmission end when the quality is satisfied, a transmission power control (TPC) command Down is set.

Further, simultaneously, at the reception end, demodulation of the received packet is performed (in a step S92), and whether or not error is included in the demodulated packet is determined by using the error detection code, for example (in a step S93). When no error is detected, the ACK signal is generated (in a step S94), and, also, when this packet is a re-transmission packet, the packet stored in the buffer is deleted. However, when error is detected, the NACK signal is generated (in a step S95). The thus-generated ACK/NACK signal and the above-mentioned transmission power control (TPC) command Up/Down is transmitted to the transmission end (in a step S97).

The transmission end receives these transmission power control (TPC) command and ACK/NACK signal, and changes the transmission power (in a step S82) if necessary.

A transmission power control method of utilizing these transmission power control command and ACK/NACK signal in combination together will now be described.

As one embodiment, the following four different combinations of the ACK/NACK signal and transmission power control command (TPC command) are assumed, for example, as shown in Table-6 below.

TABLE 6

| ACK/NACK SIGNAL | TPC COMMAND | INCREASE/DECREASE IN TRANSMISSION POWER |
|---|---|---|
| ACK | UP | $+x_0$ dB |
| NACK | UP | $+x_1$ dB |
| ACK | DOWN | $-x_1$ dB |
| NACK | DOWN | $-x_0$ dB |

WHERE $x_0 \leq x_1$.

In a case where the transmission power control command is Down and also the ACK/NACK signal is the ACK signal, it can be determined that the communication quality is the best among the above-mentioned four different combinations. In contrast thereto, in a case where the transmission power control command is Up and also the ACK/NACK signal is the NACK signal, it can be determined that the communication quality is the worst among the above-mentioned four different combinations.

Further, when setting is made such that $x_0=0$ (dB) in the above Tabel-6, change in the transmission power is actually performed only in a case where the communication situation determined from the transmission power control command coincides with the communication situation determined from the ACK/NACK signal.

Thus, not only the transmission power control command but also the ACK/NACK signal are utilized for determining the communication situation. Thereby, it is possible to achieve more positive determination of the communication quality, and this is effective for the power control in CDMA packet transmission.

Further, it is also possible to utilize not only the current ACK/NACK signal but also the past ACK/NACK signal(s) together with the transmission power control command for determining the current communication situation.

Then, the transmission end receives the ACK/NACK signal, and determines whether the ACK/NACK signal is the ACK signal or NACK signal (in a step S83). When receiving the ACK signal, the transmission end deletes the transmitted packet from the transmission buffer, and sets the transmission packet to be transmitted subsequently to be a new packet (in a step S84). However, when receiving the NACK signal, the transmission end sets the transmission packet to be a re-transmission packet (in a step S85). In FIG. 4. steps S80, S90, S86 and S98 are substantially the same as the corresponding steps in FIG. 1.

FIGS. 5, 6, 7 and 8 illustrate embodiments of packet configuration used in packet transmission in which, in packet transmission employing hybrid ARQ, when an information transmission rate is changed due to control of transmission parameter based on the ACK/NACK signal sent from the reception end as a feedback signal, the transmission end re-builds a packet and re-transmits it as the re-transmission packet, and thereby the re-built re-transmission packet and the already transmitted packet can be properly combined together at the reception end.

Here, M denotes an information transmission rate for the already transmitted packet, m denotes an information amount which is included in one packet, and a packet period denotes a time interval allocated for/occupied by one packet. It is assumed that the packet period for the already transmitted packet is L. Then, a case where this packet includes error, and, as a result, a re-transmission packet is transmitted will now be considered.

First, it is assumed that the information transmission rate at the re-transmission is reduced into M/n according to the transmission parameter control shown in FIG. 3. At this time, a packet configuration of the re-transmission packet is re-built, as follows, so that the already transmitted packet and the re-transmission packet may be combined properly at the reception end.

Figure 5:
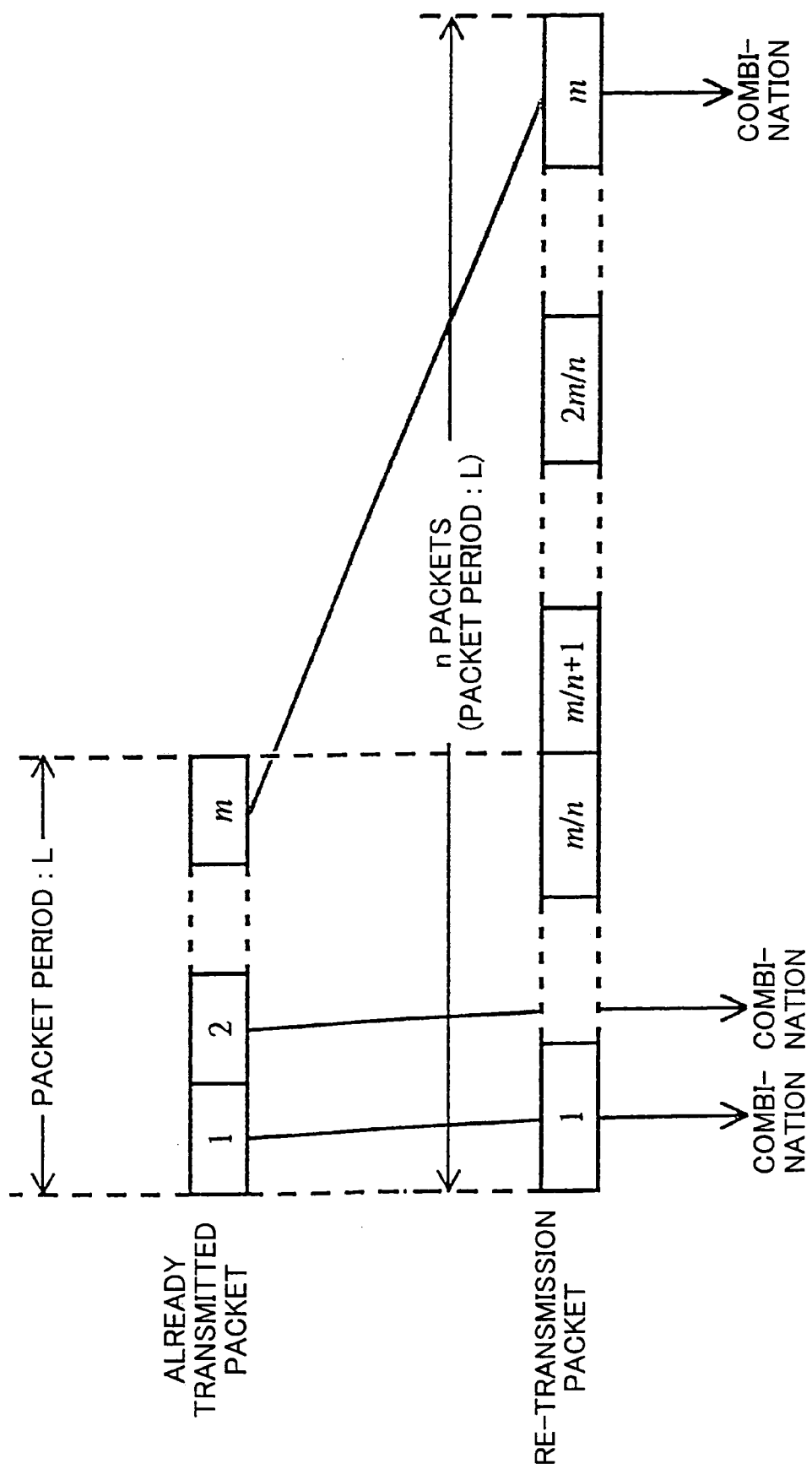
FIGS. 5 and 6 illustrate how to re-build and re-transmit a packet at a transmission end when an information transmission rate is decreased, according to the present invention.

As shown in FIG. 5, the packet period of the re-transmission packets for each packet is set to L the same as that of the already transmitted packet. In this case, as the information amount included in one packet also becomes m/n, the information amount becomes 1/n of that of the already transmitted packet if only one packet were transmitted as the re-transmission packet. If so, it would have been difficult to combine the re-transmission packet with the already transmitted packet at the reception end. Therefore, n packets are transmitted as the re-transmission packets for the single already transmitted packet, as shown in FIG. 5. Thereby, it is possible to transmit the information amount same as that of the already transmitted packet. Then, the reception end can use the thus-transmitted n re-transmission packets for being combined with the single already transmitted packet. In this example, the re-transmission packets have a configuration such that the symbols 1 through m of the already transmitted packet are arranged in the order. However, it is also possible to perform interleaving.

However, in this case, packet combining cannot be performed until all the n re-transmission packets are received. In CDMA, it is possible to reduce the spreading factor to raise the information transmission rate, thereby, to reduce this time delay.

Figure 6:
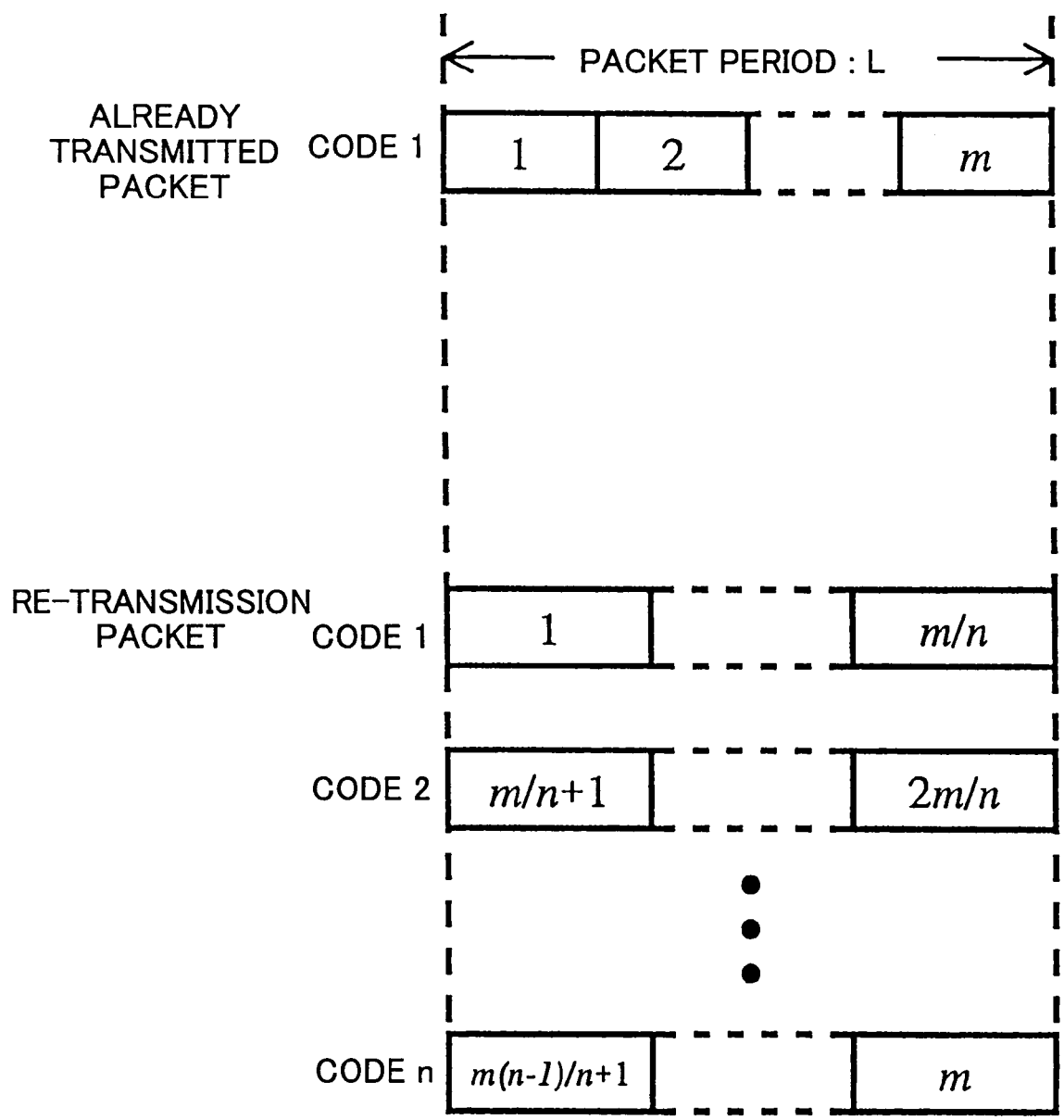

Alternatively, as shown in FIG. 6, it is possible to effectively reduce the time delay by assigning different spread codes (code 1 through code n) to the n re-transmission packets, respectively, and transmitting them simultaneously. Also in this case, the information transmission rate is M/n, the packet period is L, and the information amount for each packet is m/n, for the re-transmission packets.

On the other hand, in a case where the transmission rate at re-transmission is increased into n×M due to the transmission parameter control, the packet configuration of the re-transmission packet is re-built as follows so that the already transmitted packet and the re-transmission packet can be combined properly/effectively at the reception end.

Figure 7:
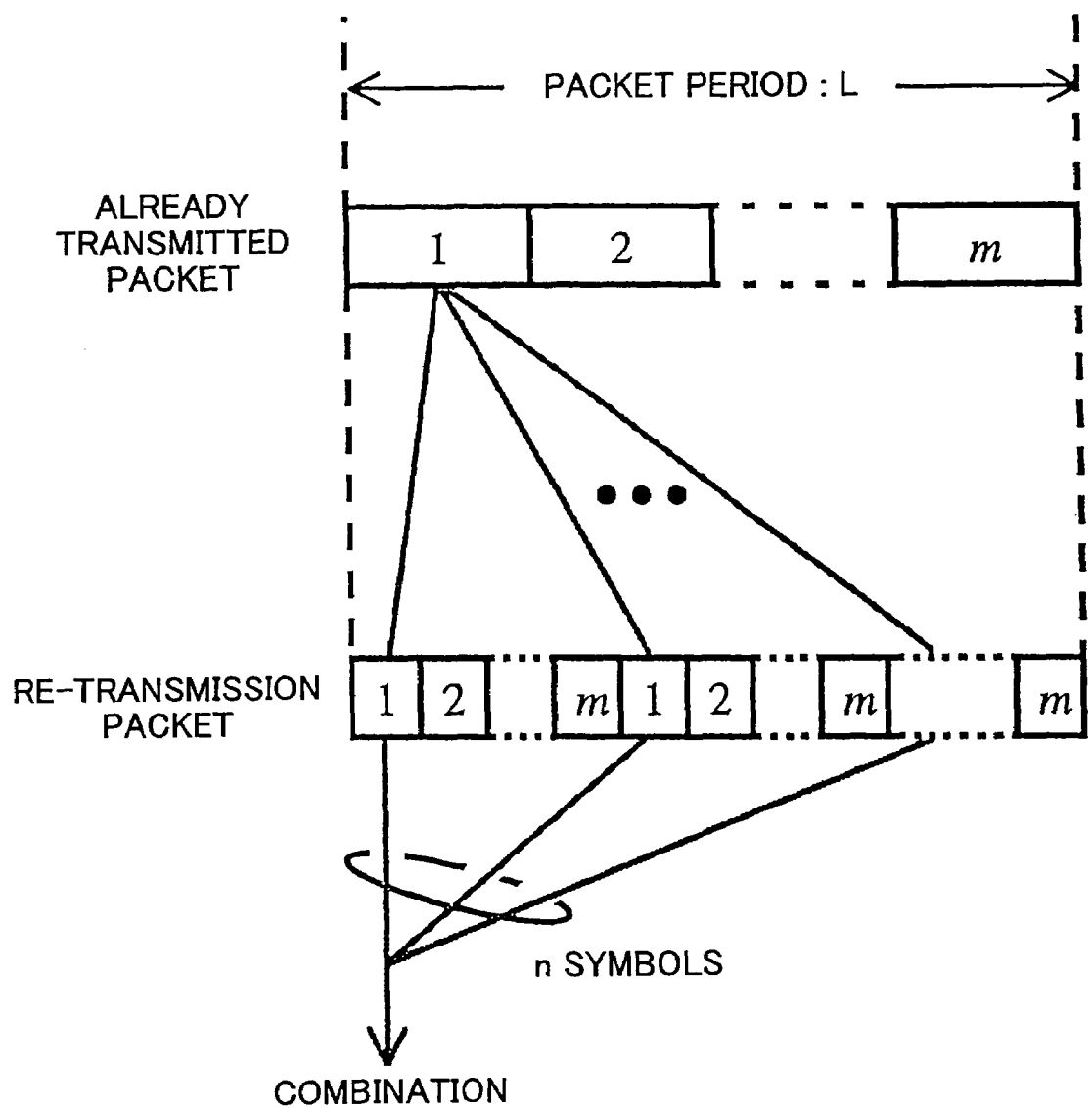
FIGS. 7 and 8 illustrate how to re-build and re-transmit a packet at a transmission end when an information transmission rate is increased, according to the present invention.

As shown in FIG. 7, when the packet period of the re-transmission packet is set to L same as that of the already transmitted packet, the information amount included in one packet becomes n×m. Accordingly, it is possible to transmit n-times amount of information in comparison to the information amount of the already transmitted packet. Therefore, as shown in FIG. 7, such a packet configuration as that the same information is repeated n times, for example. Further, also in this case, it is possible to perform interleaving.

Figure 8:
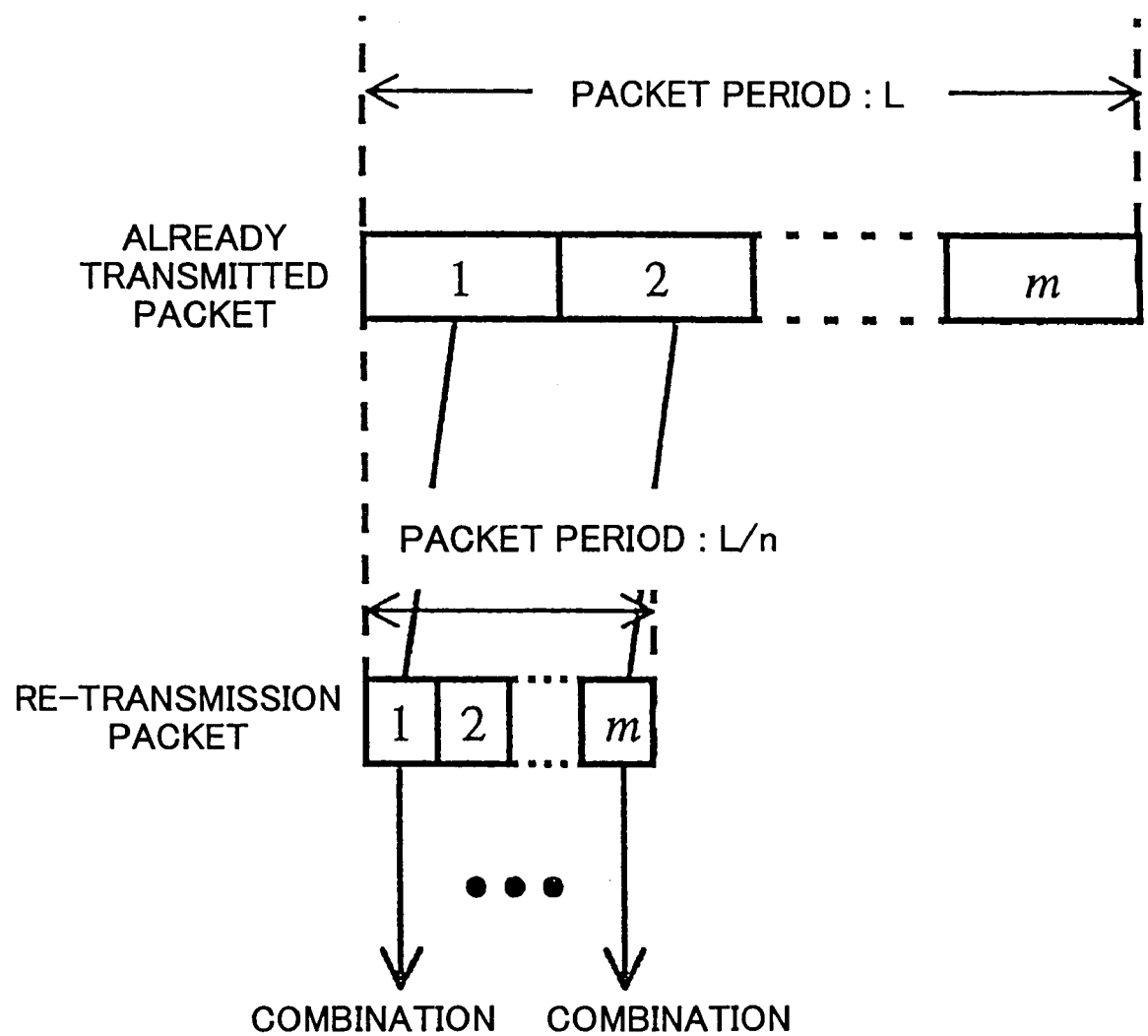

FIG. 8 shows another example of packet configuration in the case where the transmission rate in re-transmission is increased into n×M. In this case, differently from the above-described case, as shown in FIG. 8, the packet period is set to L/n. Thereby, the information amount included in one packet is the same m as that of the already transmitted packet. Accordingly, it is possible to combine the single already transmitted packet with the single re-transmission packet effectively at the reception end.

Figure 9:
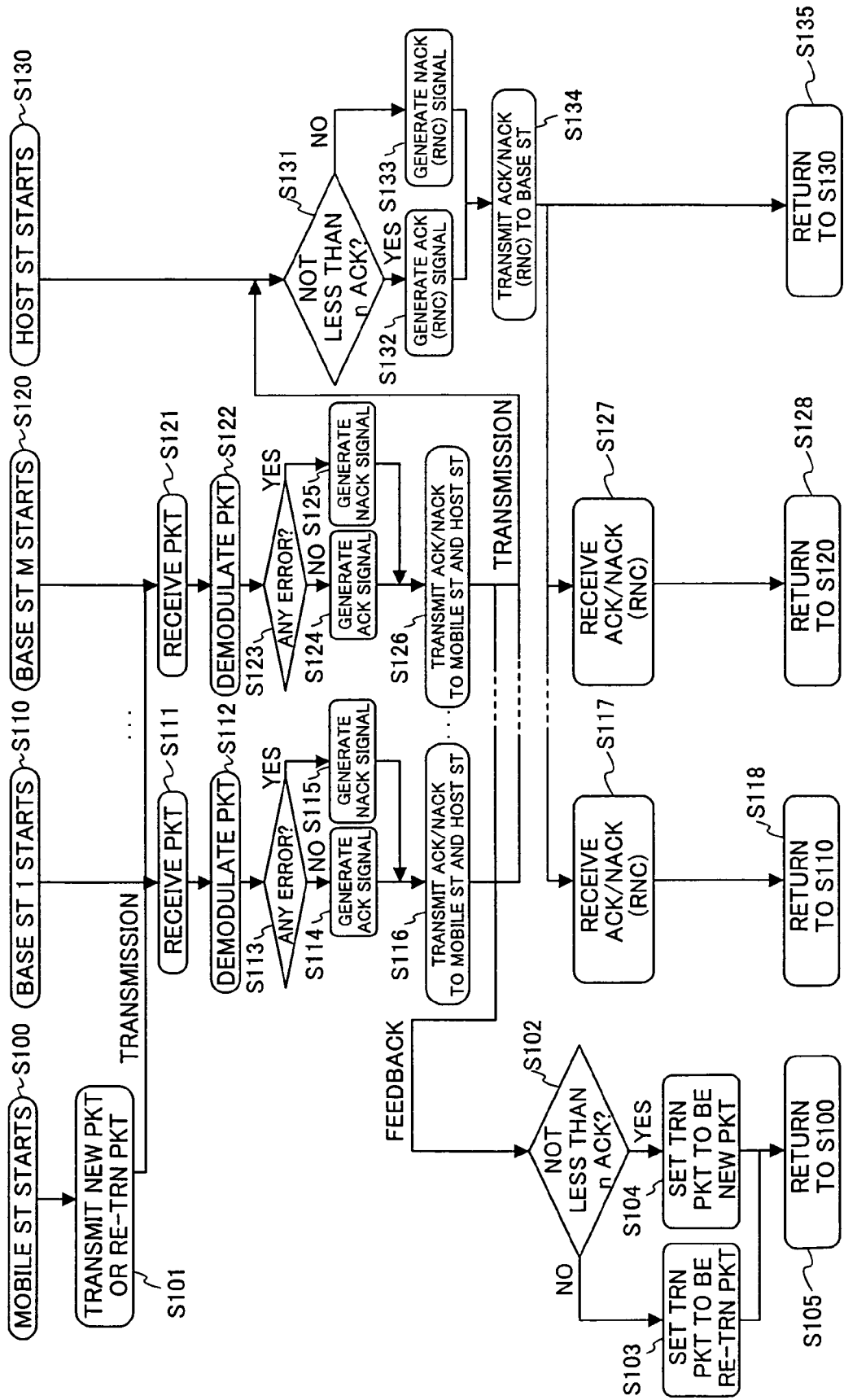
FIGS. 9 and 10 illustrate how to perform uplink site diversity reception such that a signal transmitted from a mobile station is simultaneously received by a plurality of base stations, in CDMA packet transmission, according to the present invention.

FIG. 9 shows one embodiment of an ARQ control flow in which, in a case where uplink site diversity reception is performed such that a signal transmitted from a mobile station is received by a plurality of base stations simultaneously in CDMA packet transmission, each base station generates the ACK/NACK signal and sends it to the mobile station as a feedback signal, and the mobile station performs re-transmission control by using the ACK/NACK signal given by the plurality of base stations (the number of the base stations: M).

In FIG. 9, the mobile station transmits a new packet or a re-transmission packet from a transmission buffer thereof (in a step S101). Each base station starts (in steps S110 and S120) and receives this packet (in a step S111 or S121), demodulates it (in a step S112 or S122), determines existence/absence of error (in a step S113 or S123), generates the ACK signal (in a step S114 or S124) or the NACK signal (in a step S115 or S125), and transmits the ACK/NACK signal to the transmission end (mobile station) and a host station (in a step S116 or S126).

Thus, same as in the case where site diversity is not performed, each base station sends the ACK/NACK signal to the transmission end (mobile station) as a feedback signal. Also, to the host station, the ACK/NACK signal is transmitted, and, further, when the ACK/NACK signal is the ACK signal, the demodulated packet is transmitted therefrom.

The host station determines whether or not the ACK/NACK signals sent from the M base stations include not less than n ($1 \leq n \leq M$) ACK signals (in a step S131). When not less than n ACK signals are received (in a step S132), it is determined that the demodulated packet is properly received, and then, the ACK (host) signal is transmitted, but, when only less than n ACK signals are received (in a step S133), it is determined that the demodulated packet is not properly received, and the NACK (host) signal is transmitted, to each base station as a feedback signal (in a step S134).

Each base station receives this ACK/NACK (host) signal (in a step S117 or S127), and utilizes it for management of a reception buffer thereof. Thereby, as the same ACK/NACK (host) is used among the respective base stations, the same reception buffer management is enabled between all the base stations.

On the other hand, the mobile station uses only the ACK/NACK signals sent from the plurality of base stations (the number of base stations: M) as feedback signals, and performs re-transmission control by the determination same as that in the host station. That is, when not less than n ($1 \leq n \leq M$) ACK signals are received, it is determined that the currently transmitted packet was properly demodulated at the reception end, and the transmission packet is set to be a new packet (in a step S104), but, when only less than n ACK signals are received, it is determined (in step S102) that the currently transmitted packet was not properly demodulated at the reception end, and the transmission packet is set to be a re-transmission packet (in a step S 103) so that re-transmission will be performed to the reception end. Start steps S100, S110, S120 and S130, and return steps S105, S118, S128 and S135 are similar to those previously described, and are therefore not discussed in detail.

Thereby, even when uplink site diversity reception is performed, the host station and mobile station can perform determinations as to existence/absence of packet error independently. Especially, as the mobile station can perform re-transmission control independently without waiting for a final determination from the host station, it is possible to prevent processing delay, and, also, to effectively reduce an amount of the necessary transmission buffers.

Further, there may be a case where, due to errors caused by the poor channel condition, transmission/reception buffer control is different between the mobile station and the base stations. In order to deal with such a case, it is possible that, a timer is used in each base station, and, a control is added such that, when a packet stored in the reception buffer is not received after a predetermined time has elapsed, the packet is discarded, or re-transmission request for the packet is sent to the mobile station, for example.

Figure 10:
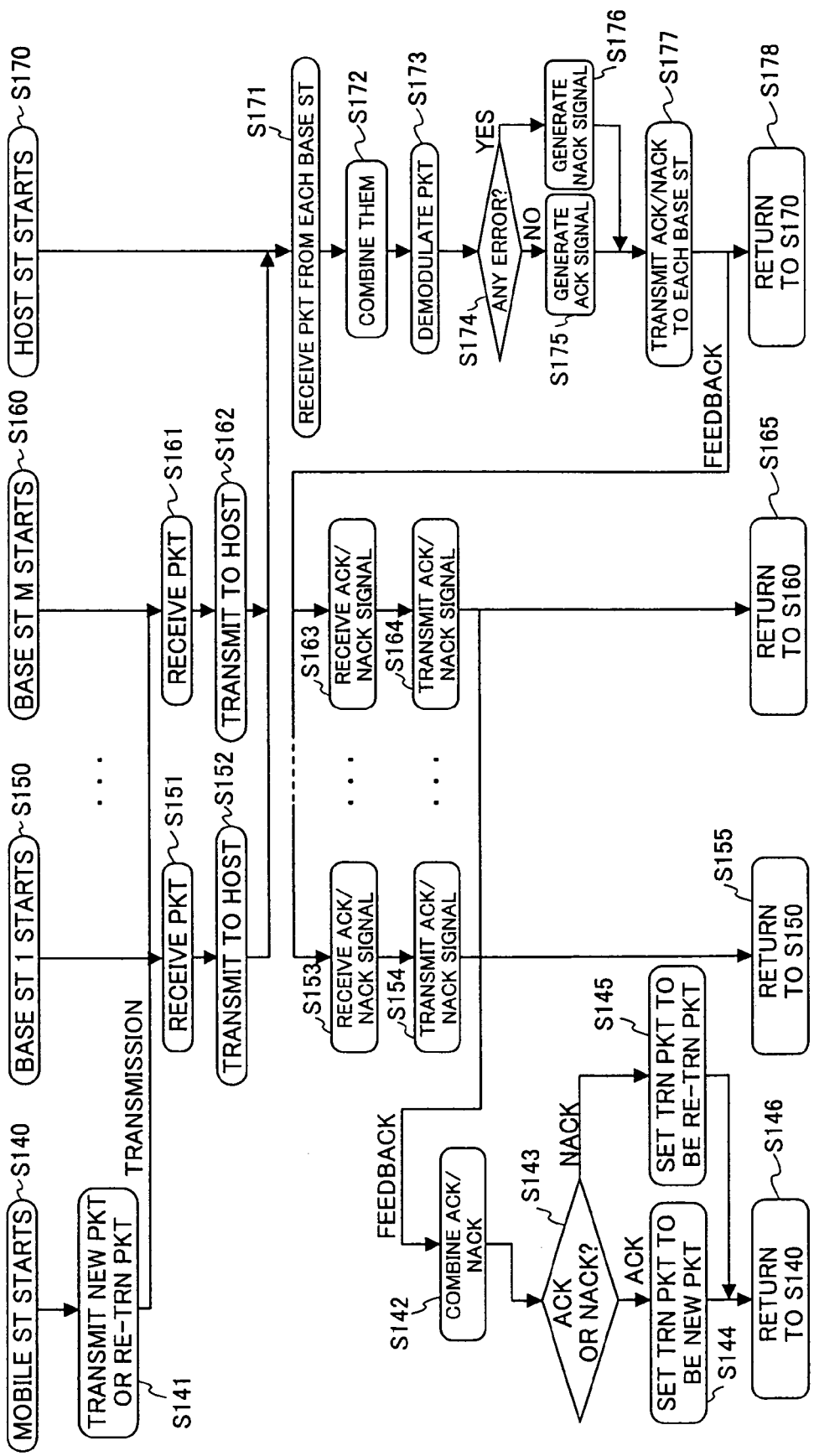

FIG. 10 shows one embodiment of an ARQ control flow in which, in a case where uplink site diversity reception is performed such that a signal transmitted from the mobile station is received by the plurality of base stations (the number of base stations: M) simultaneously in CDMA packet transmission, the host station of the base stations generates the ACK/NACK signal, and transmits it to the mobile station via the plurality of base stations, re-transmission control being performed thereby.

When receiving a packet (S151 or S161), each base station transmits the packet to the host station (S152 or S162). The host station receives the packets transmitted from the plurality of base stations (S171), combines them together (S172), demodulates the thus-obtained information (S173), and generates the ACK/NACK signal accordingly and transmit it (S174, S175, S176 and S177). Each base station receives the thus-transmitted same ACK/NACK signal from the host station (S153 or S163), and transmits this signal to the mobile station (S154 or S164).

The mobile station receives the ACK/NACK signals from the plurality of base stations, combines them (S142) and determines ACK/NACK (S143). In FIG. 10 steps S140, S141, S150, S160, S144, S145, S146, S155, S165 and S178 are substantially the same as corresponding steps previously described, and therefore are not discussed in detail.

In this embodiment, as the packets from the plurality of base stations are combined together, the reliability of the received packet is effectively improved. The ACK/NACK signal generated by the host station is transmitted to the mobile station via the plurality of base stations which perform site diversity reception. The mobile station performs re-transmission control by using the same ACK/NACK signals transmitted from the plurality of base stations.

Figure 11:
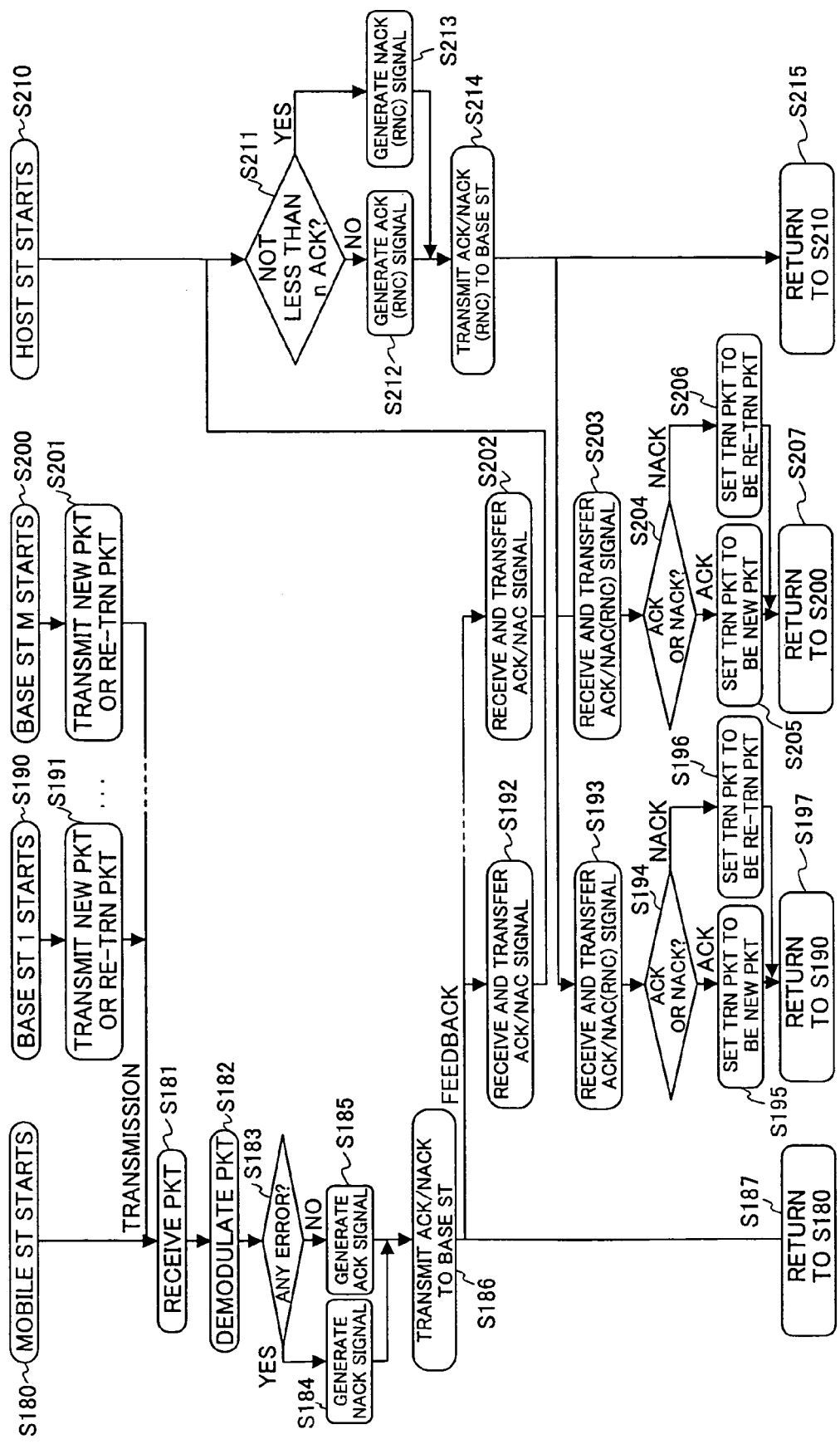
FIG. 11 illustrates how to perform downlink site diversity reception such that signals transmitted from a plurality of base stations are simultaneously received by a mobile station, in CDMA packet transmission, according to the present invention.

FIG. 11 shows one embodiment of ARQ control flow in which in a case where downlink site diversity reception is made such that signals transmitted from the plurality of base station are received by the mobile station simultaneously in CDMA packet transmission, and, after the plurality of base stations (the number of base stations: M) receive the ACK/NACK signal sent from the mobile station as a feedback signal, the respective base stations transmit the ACK/NACK signals to the host station, the plurality of ACK/NACK signals are combined there, and then, re-transmission control is performed.

When receiving the ACK/NACK signal from the mobile station, each base station transfers the ACK/NACK signal to the host station (S192 or S202). When receiving not less than n ACK signals (1≦n≦M), the host station determines that the currently transmitted packet was properly received at the mobile station, sets the ACK/NACK signal to be ACK (host) (S211 and S212), but, when receiving only less than n ACK signals, the host station determines that the currently transmitted packet was not properly received at the mobile station, sets the ACK/NACK signal to be NACK (host) (S211 and S213). The remaining steps in FIG. 11 are substantially the same as corresponding steps previously described, and are therefore not described in detail.

Thereby, as the plurality of base stations performing downlink site diversity transmit the same ACK/NACK signals, it is possible that the mobile station can obtain site diversity effect.

The present invention is not limited to the above-described embodiments, and variations and modifications may be made without departing from the scope of the present invention.

The present application is based on Japanese priority application No. 2000-191789, filed on Jun. 26, 2000, the entire contents of which are hereby incorporated by reference.

What is claimed is:

1. A communication method comprising the steps of:
    a) transmitting an ACK signal indicating that a received packet includes no error or a NACK signal indicating that the received packet includes error from a reception station to a transmission station, and performing automatic repeat request;
    b) obtaining reliability of the received packet when demodulating the received packet at the reception station; and
    c) reporting from the reception station to the transmission station the reliability of the received packet, utilizing the ACK/NACK signal, wherein the NACK signal expresses at least two levels of reliability;
    d) determining based on the reliability of said received packet whether or not said received packet should be stored to be combined with a re-transmission packet, when said received packet includes an error; and
    e) performing re-transmission control based on the determination made in said step d).

2. The method as claimed in claim 1, further comprising the step of f) performing control of a transmission parameter at the transmission station based on the ACK/NACK signal transmitted from the reception station.

3. A communication method in a mobile communication system performing power control at a transmission station so that reception quality at a reception station may be kept constant, comprising the steps of:
    a) transmitting an ACK signal indicating that a received packet includes no error or a NACK signal indicating that the received packet includes error from a reception station to a transmission station, and performing automatic repeat request;
    b) storing a history of the received ACK/NACK signals, and performing control of a transmission parameter utilizing at least one ACK/NACK signal and a transmission power control signal at the transmission station; and
    c) performing re-transmission control based on the transmission parameter, wherein the NACK signal expresses at least two levels of reliability.

4. The method as claimed in claim 3, further comprising the step of d) re-transmitting a re-transmission packet rebuilt so as to be able to be properly combined with an already transmitted packet at the reception station, when an information transmission rate for transmission from the transmission station is changed through the transmission parameter control at the transmission station.

5. A communication method in a mobile communication system, comprising the steps of:
    a) a reception station transmitting an ACK signal indicating that a received packet includes no error or a NACK signal indicating that the received packet includes error, to a transmission station, and performing automatic repeat request;
    b) when uplink site diversity reception is performed such that a plurality of reception stations simultaneously receive a signal transmitted from a transmission station, the plurality of reception stations generating the ACK/

NACK signals, and transmitting the ACK/NACK signals to the transmission station and a host station of the plurality of reception stations;

c) said host station of the plurality of reception stations receiving the ACK/NACK signals from the plurality of reception stations, and, upon receiving more than n ACK signals, where n denotes an integer not less than 1, generating the ACK signal so as to transmit it to the respective reception stations; and d) said transmission station performing re-transmission control utilizing the ACK/NACK signals from the plurality of reception stations.

6. The method as claimed in claim 5, further comprising the step of e) determining at the transmission station that proper reception was performed at the reception end, when the transmission station receives the ACK/NACK signals from the plurality of reception stations which include not less than n ($\geq 1$) ACK signals.

7. A communication method in a mobile communication system, comprising the steps of:

a) a reception station transmitting an ACK signal indicating that a received packet includes no error or a NACK signal indicating that the received packet includes error, to a transmission station, and performing automatic repeat request;

b) when up link site diversity reception is performed such that a plurality of reception stations simultaneously receive a signal transmitted from a transmission station, the reception station obtaining reliability of a received packet upon demodulating the received packet, and reporting to the transmission station and a host station of the plurality of reception stations the reliability of the received packet with the ACK/NACK signal wherein the NACK signal expresses at least two levels of reliability; and c) said host station generating based on the plurality ACK/NACK signals reported thereto the ACK/NACK signal, and, said plurality of reception stations transmitting the same ACK/NACK signals generated by the host station to the transmission station.

8. A communication method in a mobile communication system, comprising the steps of:

a) transmitting an ACK signal indicating that a received packet includes no error or a NACK signal indicating that the received packet includes error, from a reception end to a transmission end, and performing automatic repeat request; and b) when downlink site diversity reception is performed such that signals transmitted from a plurality of base stations are simultaneously received by a mobile station, demodulating a received packet at the mobile station, generating the ACK/NACK signal, and transmitting the ACK/NACK signal to the mobile station and a host station of the plurality of base stations; and c) when a host station of the plurality of base stations receives the ACK/NACK signals via the plurality of base stations which include not less than ($\geq 1$) ACK signals, determining that the plurality of base stations performed proper reception, then re-transmission control being performed at the plurality of base stations.

9. A base station using an ACK/NACK signal and performing automatic repeat request, wherein said base station participates in uplink site diversity as one of a plurality of base stations that simultaneously receive a signal transmitted from a mobile station, said base station comprising:

a part generating the ACK/NACK signal and transmitting the ACK/NACK signal to the mobile station and to a host station; and a part receiving the common ACK/NACK signal from the host station of the plurality of base stations.

* * * * *